United States Patent
Urano

(10) Patent No.: US 10,218,186 B2
(45) Date of Patent: Feb. 26, 2019

(54) POWER FEEDING DEVICE AND NON-CONTACT POWER TRANSMISSION DEVICE

(71) Applicant: TDK CORPORATION, Tokyo (JP)

(72) Inventor: Takashi Urano, Tokyo (JP)

(73) Assignee: TDK CORPORATION, Tokyo (JP)

( * ) Notice: Subject to any disclaimer, the term of this patent is extended or adjusted under 35 U.S.C. 154(b) by 475 days.

(21) Appl. No.: 14/976,885

(22) Filed: Dec. 21, 2015

(65) Prior Publication Data

US 2016/0204621 A1    Jul. 14, 2016

(30) Foreign Application Priority Data

Jan. 8, 2015   (JP) ................... 2015-002225

(51) Int. Cl.
H01F 27/42   (2006.01)
H01F 37/00   (2006.01)
(Continued)

(52) U.S. Cl.
CPC ............. H02J 5/005 (2013.01); B60L 11/182 (2013.01); B60L 11/1831 (2013.01); B60L 11/1837 (2013.01); H01F 38/14 (2013.01); H02J 50/10 (2016.02); H02J 50/90 (2016.02); H02J 7/025 (2013.01); H02J 50/40 (2016.02); Y02T 10/7005 (2013.01); Y02T 10/7072 (2013.01); Y02T 90/121 (2013.01); Y02T 90/122 (2013.01); Y02T 90/125 (2013.01); Y02T 90/128 (2013.01); Y02T 90/14 (2013.01)

(58) Field of Classification Search
CPC ............... B60L 11/182; B60L 11/1831; B60L 11/1837; H01F 38/14; H02J 5/005; H02J 50/10; H02J 50/90; H02J 50/40; H02J 7/025; Y02T 10/7005; Y02T 10/7072; Y02T 90/121; Y02T 90/122; Y02T 90/125; Y02T 90/128; Y02T 90/14
USPC ............................................ 307/104
See application file for complete search history.

(56) References Cited

U.S. PATENT DOCUMENTS

2014/0049118 A1 * 2/2014 Karalis .................. H01F 38/14
                                                       307/104
2014/0138199 A1   5/2014 Ichikawa et al.
2015/0279557 A1 * 10/2015 Chiyo .................... H01F 38/14
                                                       307/104

FOREIGN PATENT DOCUMENTS

JP   2014-103802 A   6/2014

* cited by examiner

*Primary Examiner* — Hal Kaplan
*Assistant Examiner* — Toan Vu
(74) *Attorney, Agent, or Firm* — Oliff PLC

(57) ABSTRACT

Power feeding device and non-contact power transmission device which are capable of maintaining high power transmission efficiency even if any displacement occurs in relative positions of each power feeding coil among plurality of power feeding coils and power receiving coil are provided. Power feeding device includes power feeding coil unit which includes magnetic body unit in which at least three magnetic bodies are arranged to be spaced apart in first direction, and plurality of power feeding coils each formed of wire wound around at least two magnetic bodies in magnetic body unit, and plurality of power feeding coils, which are located adjacently in the first direction, are configured such that wires of the plurality of power feeding coils are wound in common around one or more magnetic bodies, number of which is less than number of magnetic bodies around which wires of the respective power feeding coils and are wound.

8 Claims, 10 Drawing Sheets

(51) Int. Cl.
*H01F 38/00* (2006.01)
*H02J 5/00* (2016.01)
*H02J 50/90* (2016.01)
*H02J 50/10* (2016.01)
*B60L 11/18* (2006.01)
*H01F 38/14* (2006.01)
H02J 7/02 (2016.01)
H02J 50/40 (2016.01)

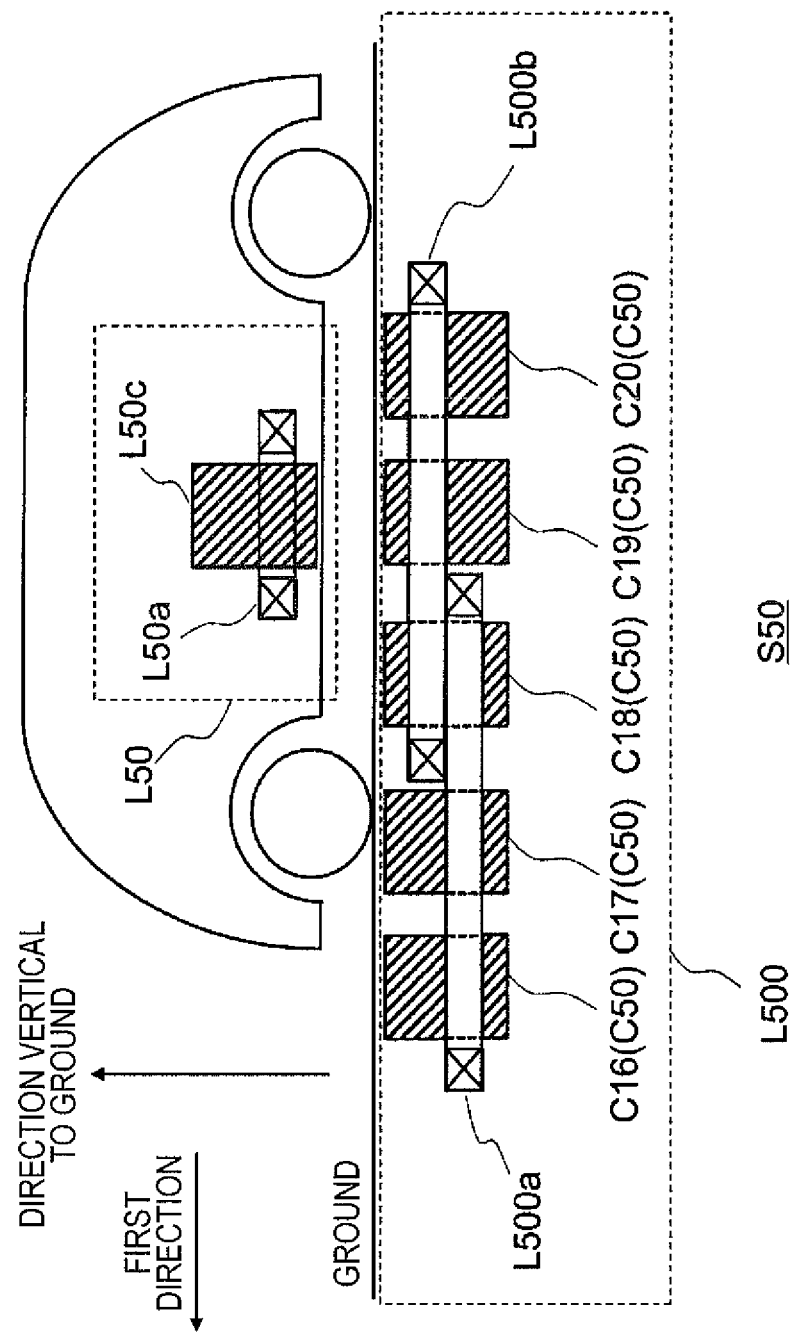

POWER FEEDING DEVICE AND NON-CONTACT POWER TRANSMISSION DEVICE

BACKGROUND

The present invention relates to a power feeding device and a non-contact power transmission device.

Non-contact power transmission technology for supplying power without a power supply cord is increasingly attracting attention. The current non-contact power transmission technology is mainly of a type that utilizes electromagnetic induction, and is expected to be applied to various fields.

In view of such a background, an approach has been studied in which, for example, an electric vehicle is provided with a power receiving coil (power receiving side) on the lower part thereof and high power (for example, several kilowatts (kW) to several tens of kilowatts (kW)) is transmitted from a power feeding coil (power feeding side) on the ground side to the power receiving coil (power receiving side) in a non-contact manner. The use of this non-contact power transmission technology enables power transmission without any mechanical coupling between the power feeding side and the power receiving side.

Incidentally, such non-contact power transmission technology has a problem in that displacements of the relative positions of a power feeding coil disposed on the ground side and a power receiving coil provided in a vehicle cause a reduction in power transmission efficiency. In non-contact power transmission technology, it is therefore known that it is particularly important not to cause any displacement in the relative positional relationship between a power feeding coil and a power receiving coil.

For example, Patent Literature 1 proposes a power feeding device including a plurality of power feeding coils arranged to be spaced apart, and a control unit that controls a selection unit which selects a primary coil to which power is supplied from a power supply.

PRIOR ART REFERENCE

Patent Reference

[Patent Literature 1] Japanese Unexamined Patent Application Publication No. 2014-103802

SUMMARY

In the technique disclosed in Patent Literature 1, however, since a plurality of power feeding coils are arranged to be spaced apart, a problem occurs in that high power transmission efficiency is not maintainable when a power receiving coil is located between the plurality of power feeding coils.

Accordingly, it is an object of the present invention to provide a power feeding device and a non-contact power transmission device which are capable of maintaining high power transmission efficiency even if any displacement occurs in the relative positions of each power feeding coil among a plurality of power feeding coils and a power receiving coil.

To achieve the object described above, a power feeding device according to the present invention is a power feeding device for transmitting power to a power receiving device in a non-contact manner, the power feeding device including a power feeding coil unit which includes a magnetic body unit in which at least three magnetic bodies are arranged to be spaced apart in a first direction, and a plurality of power feeding coils each formed of a wire wound around at least two magnetic bodies in the magnetic body unit; a selection unit that selects a coil to which power is supplied from among the plurality of power feeding coils; and a drive unit that supplies power to the coil selected by the selection unit, wherein the plurality of power feeding coils, which are located adjacently in the first direction, are configured such that the wires of the plurality of power feeding coils are wound in common around one or more magnetic bodies, the number of which is less than the number of magnetic bodies around which the wires of the respective power feeding coils are wound.

According to the present invention, a power feeding coil unit includes a magnetic body unit in which at least three magnetic bodies are arranged to be spaced apart in a first direction, and a plurality of power feeding coils each formed of a wire wound around at least two magnetic bodies in the magnetic body unit, and the plurality of power feeding coils, which are located adjacently in the first direction, are configured such that the wires of the plurality of power feeding coils are wound in common around one or more magnetic bodies, the number of which is less than the number of magnetic bodies around which the wires of the respective power feeding coils are wound. This enables the overlap of parts of regions of the respective power feeding coils where power can be fed. Thus, a region with the reduced efficiency of power transmission from a power feeding device to a power receiving device can be reduced, enabling high power transmission efficiency to be maintained even if any displacement occurs in the relative positions of each power feeding coil among the plurality of power feeding coils and a power receiving coil.

Preferably, the wires of the plurality of power feeding coils may be arranged alternately in a second direction perpendicular to the first direction around the one or more magnetic bodies around which the wires are wound in common. In this case, an imbalance between regions of the respective power feeding coils where power can be fed can be suppressed. Thus, a region with the reduced efficiency of power transmission from the power feeding device to the power receiving device can further be reduced, enabling expansion of the range over which power transmission efficiency can be maintained even if any displacement occurs in the relative positions of each power feeding coil among the plurality of power feeding coils and the power receiving coil.

Preferably, the plurality of power feeding coils, which are located adjacently in the first direction, may be configured such that the number of magnetic bodies around which only the wire of one power feeding coil is wound is larger than the number of magnetic bodies around which the wire of the one power feeding coil and the wire of another power feeding coil are wound in common. In this case, a region of each of the power feeding coils where power can be fed can further be expanded. Thus, a region with the reduced efficiency of power transmission from the power feeding device to the power receiving device can be reduced, enabling expansion of the range over which power transmission efficiency can be maintained even if any displacement occurs in the relative positions of each power feeding coil among the plurality of power feeding coils and the power receiving coil.

A non-contact power transmission device according to the present invention is a non-contact power transmission device for transmitting power from a power feeding device to a power receiving device in a non-contact manner, wherein the power feeding device is constituted by the power feeding device described above, and the power receiving device includes a power receiving coil, and a rectifier unit that rectifies power received by the power receiving coil and outputs the rectified power to a load.

According to the present invention, a non-contact power transmission device can be achieved which is capable of maintaining high power transmission efficiency even if any displacement occurs in the relative positions of each power feeding coil among a plurality of power feeding coils and a power receiving coil.

According to the present invention, a power feeding device and a non-contact power transmission device can be provided which are capable of maintaining high power transmission efficiency even if any displacement occurs in the relative positions of each power feeding coil among a plurality of power feeding coils and a power receiving coil.

BRIEF DESCRIPTION OF THE DRAWINGS

FIG. 10 is a schematic diagram of a non-contact power transmission device according to another application example of the present invention.

DETAILED DESCRIPTION OF EMBODIMENTS

Embodiments for carrying out the present invention will be described in detail with reference to the drawings. The present invention is not limited by the content of the description of the following embodiments. In addition, constituent elements described hereinbelow include one that can easily contemplated by a person skilled in the art, and ones that are substantially the same. In the description, furthermore, the same elements or elements having the same function are represented by using the same numeral, and redundant descriptions are omitted.

Figure 1:
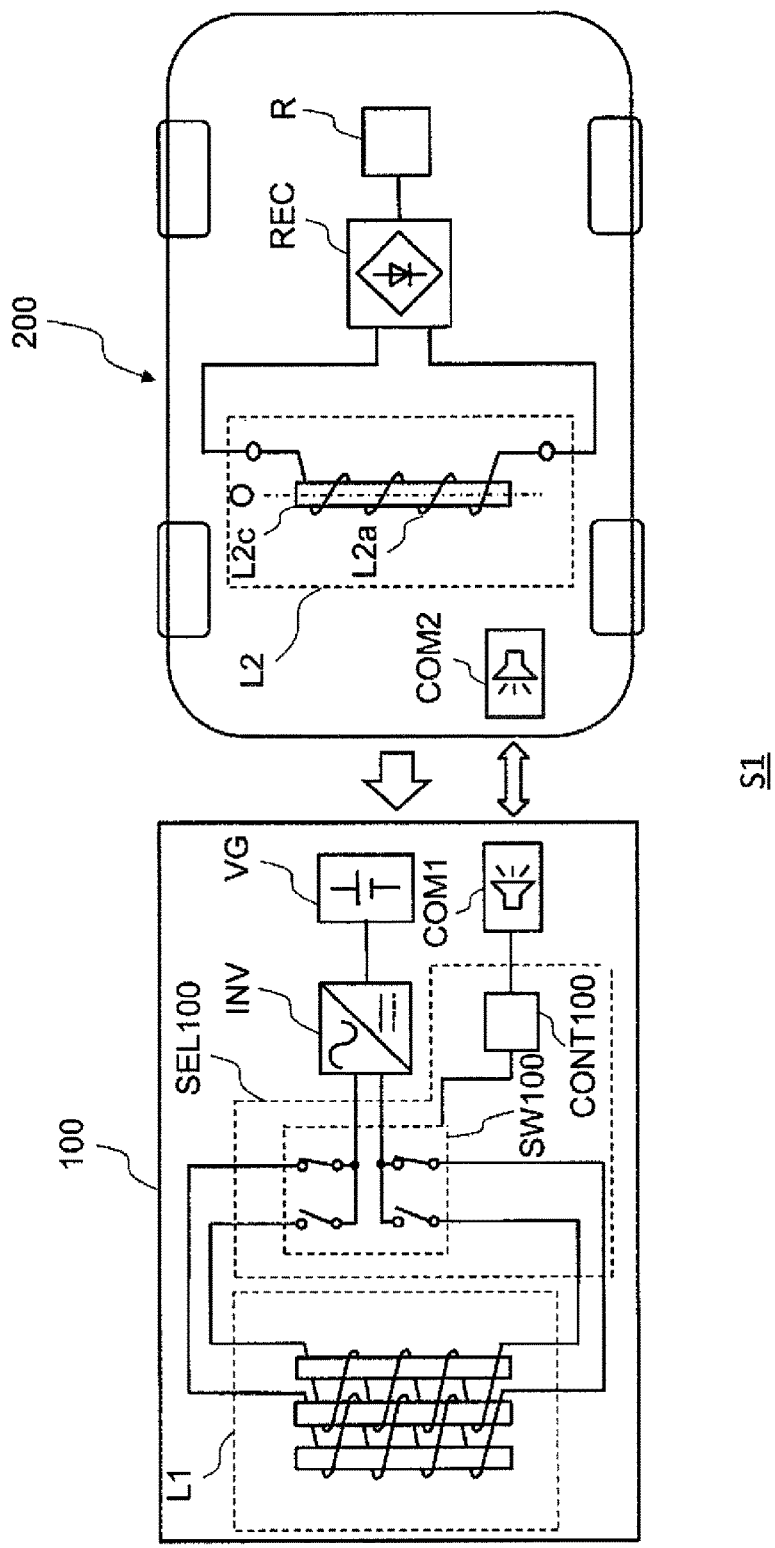
FIG. 1 is a schematic diagram of a non-contact power transmission device according to a first embodiment of the present invention.
Figure 2:
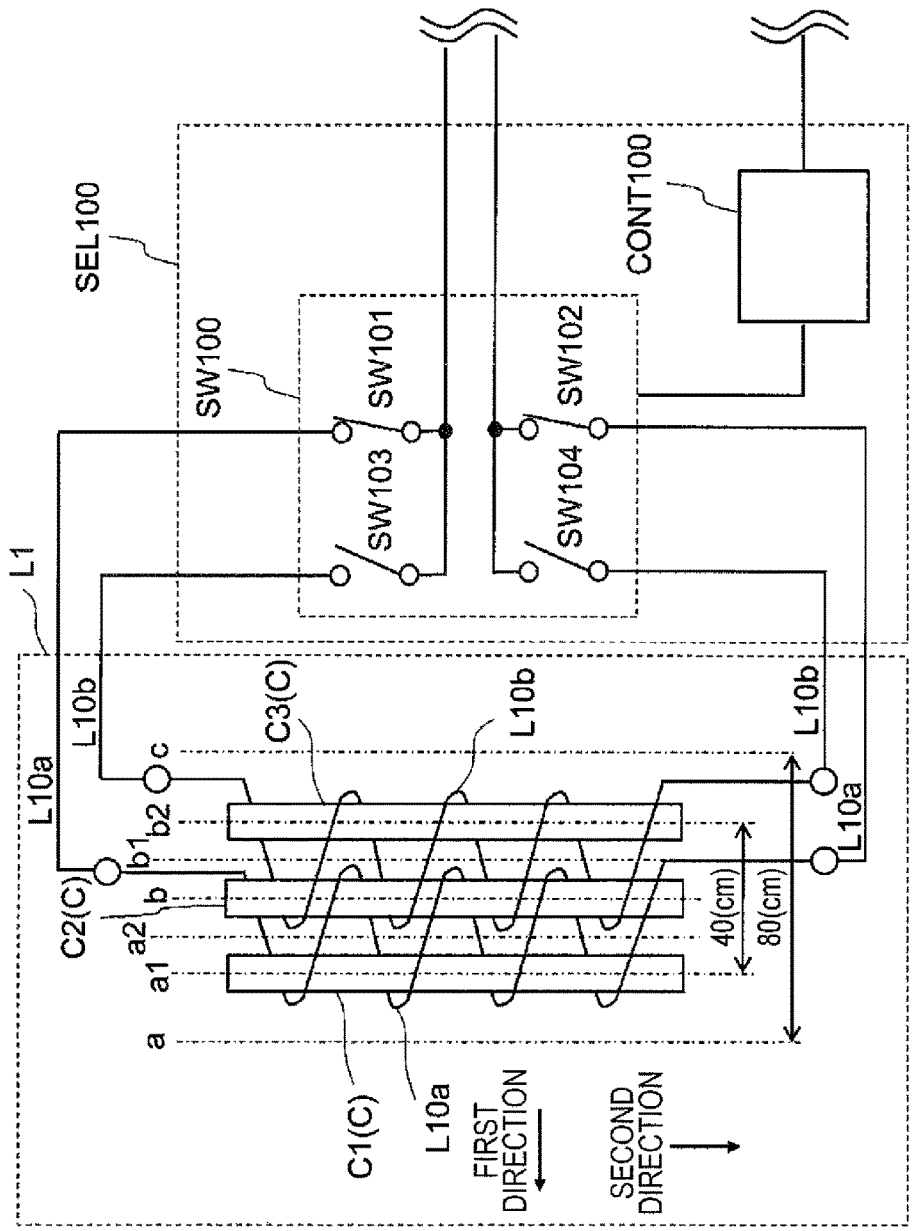
FIG. 2 is a partial enlarged view of a power feeding coil unit and a selection unit of the present invention in FIG. 1.

The overall configuration of a non-contact power transmission device S1 according to a first embodiment of the present invention will be described with reference to FIG. 1 and FIG. 2. FIG. 1 is a schematic diagram of a non-contact power transmission device according to the first embodiment of the present invention. FIG. 2 is a partial enlarged view of a power feeding coil unit and a selection unit in FIG. 1.

As illustrated in FIG. 1, the non-contact power transmission device S1 includes a power feeding device 100 and a power receiving device 200. A description will be made here using an example in which the non-contact power transmission device S1 is applied to a power feeding facility for a moving object such as an electric vehicle.

The power feeding device 100 includes a power supply VG, a drive unit INV, a power feeding coil unit L1, a selection unit SEL100, and a communication unit COM1. The power supply VG supplies direct-current power to the drive unit INV. The power supply VG is not limited to a particular type so long as it is configured to output direct-current power, examples of which include a direct-current power supply that is produced by rectifying and smoothing a commercial alternating-current power supply, a secondary battery, a solar photovoltaic direct-current power supply, and a switching power supply such as a switching converter.

The drive unit INV converts the direct-current power supplied from the power supply VG into alternating-current power, and supplies the alternating-current power to the power feeding coil unit L1 described below. That is, the drive unit INV functions as an inverter. The drive unit INV is constituted by, for example, a switching circuit in which a plurality of switching elements (not illustrated) are bridge-connected. Examples of the switching elements constituting the switching circuit include elements such as MOS-FET (Metal Oxide Semiconductor-Field Effect Transistor) and IGBT (Insulated Gate Bipolar Transistor).

The power feeding coil unit L1 functions as a power feeding unit that feeds the alternating-current power supplied from the drive unit INV to the power receiving device 200 described below in a non-contact fashion. In this embodiment, the power feeding coil unit L1 is installed in the ground or installed on or near the ground. The power feeding coil unit L1 includes a magnetic body unit C and a plurality of power feeding coils L10.

In the magnetic body unit C, as illustrated in FIG. 2, three magnetic bodies C1 to C3 are arranged to be spaced apart in a first direction. The three magnetic bodies C1 to C3 each have a substantially rectangular parallelepiped shape, and have the same dimensions and shape in this embodiment. In addition, the three magnetic bodies C1 to C3 are arranged such that the longitudinal directions thereof are perpendicular to the first direction and the ends thereof in the respective longitudinal directions are aligned in the first direction. In this embodiment, the magnetic body C2 is arranged between the magnetic body C1 and the magnetic body C3, and the interval between the magnetic body C1 and the magnetic body C2 is equal to the interval between the magnetic body C2 and the magnetic body C3. That is, the three magnetic bodies C1 to C3 are arranged in alignment in the first direction. Here, the "first direction" is set as appropriate in accordance with a direction in which the reduction in power transmission efficiency caused by displacements of the relative positions of each power feeding coil among a plurality of power feeding coils and a power receiving coil is to be suppressed. In this embodiment, the first direction coincides with the direction of travel of the electric vehicle. However, in a case where the reduction in power transmission efficiency caused by displacements of the relative positions of each power feeding coil and a power receiving coil in a direction perpendicular to the direction of travel of the electric vehicle is to be suppressed, the first direction coincides with the direction perpendicular to the direction of travel of the electric vehicle. Examples of the magnetic material constituting the three magnetic bodies C1 to C3 include ferrite, permalloy, and silicon steel plate, and the higher the relative magnetic permeability for air, the more preferable. For example, it is preferable that a magnetic material having a direct-current initial permeability of 1000 or more be used. In a case where the alternating-current current supplied from the drive unit INV to the power feeding coil unit L1 has a frequency of several kilohertz (kHz) to several hundreds of kilohertz (kHz), in terms of low core loss in high-frequency domains and the ability to suppress the generation of heat in a magnetic body, the magnetic material constituting the three magnetic bodies C1 to C3 is preferably ferrite, more preferably, for example, Mn—Zn ferrite with a direct-current initial permeability of approximately 1500 to 10000 and a saturation magnetic flux density of approximately 0.35 to 0.4 T. Furthermore, in a case where the frequency of the alternating-current current supplied from the drive unit INV to the power feeding coil unit L1 is a commercial frequency of approximately 50 to 60 Hz, in terms of magnetic saturation being less likely to occur in the low-frequency domain of the commercial frequencies, the magnetic material constituting the three magnetic bodies C1 to C3 is preferably silicon steel plate, more preferably, for example, silicon steel plate with a direct-current initial permeability of approximately 1000 to 3000 and a saturation magnetic flux density of approximately 1.8 to 2 T. In this embodiment, the magnetic body unit C is constituted by the three magnetic bodies C1 to C3, which is not limited thereto, and it is sufficient that the magnetic body unit C includes at least the three magnetic bodies C1 to C3.

As illustrated in FIG. 2, the plurality of power feeding coils L10 include a power feeding coil L10$a$ and a power feeding coil L10$b$ which are located adjacently in the first direction. Specifically, the power feeding coil L10$a$ is formed of a wire wound around two magnetic bodies of the magnetic body unit C, namely, the magnetic body C1 and the magnetic body C2, and the power feeding coil L10$b$ is formed of a wire wound around two magnetic bodies of the magnetic body unit C, namely, the magnetic body C2 and the magnetic body C3. In this embodiment, the wires of the power feeding coil L10$a$ and the power feeding coil L10$b$ are wound in common around the magnetic body C2. That is, the number of magnetic bodies (one magnetic body) around which the wire of the power feeding coil L10$a$ and the wire of the power feeding coil L10$b$ are wound in common is smaller than the number of magnetic bodies (two magnetic bodies) around which the wires of the power feeding coil L10$a$ and the power feeding coil L10$b$ are wound. In addition, the wires of the power feeding coil L10$a$ and the power feeding coil L10$b$ are arranged alternately in a second direction perpendicular to the first direction around the magnetic body C2 around which the wires are wound in common. That is, the wire of the power feeding coil L10$a$ and the wire of the power feeding coil L10$b$ do not overlap each other at the magnetic body C2 and are wound so as to be spaced from each other. The intervals at which the wire of the power feeding coil L10$a$ and the wire of the power feeding coil L10$b$ are wound around the magnetic body C2 are preferably equal in the second direction. In this case, an imbalance between a region of the power feeding coil L10$a$ where power can be fed and a region of the power feeding coil L10$b$ where power can be fed can be suppressed.

Examples of the wires constituting the power feeding coil L10$a$ and the power feeding coil L10$b$ include a Litz wire made by twisting together multiple metal wires such as copper or aluminum wires. Further, the numbers of turns of the power feeding coil L10$a$ and the power feeding coil L10$b$ are set as appropriate based on the desired power transmission efficiency. Preferably, the power feeding coil L10$a$ and the power feeding coil L10$b$ are composed of metal wires of the same material and have the same number of turns, in terms of making the amounts of magnetic flux generated by the current flowing through the coils equal.

The selection unit SEL100 has a function of selecting a coil to which power is supplied from the plurality of power feeding coils L10. Specifically, the selection unit SEL100 selects a single power feeding coil from among the plurality of power feeding coils L10. The selection unit SEL100 includes a switching unit SW100 constituted by four switches SW101 to SW104, and a control unit CONT100. The switching unit SW100 is disposed between the drive unit INV and the power feeding coil unit L1. In this embodiment, one end of the drive unit INV is connected to the switches SW101 and SW103, and the other end of the drive unit INV is connected to the switches SW102 and SW104. Further, one end of the power feeding coil L10$a$ is connected to the switch SW101, and the other end of the power feeding coil L10$a$ is connected to the switch SW102. Moreover, one end of the power feeding coil L10$b$ is connected to the switch SW103, and the other end of the power feeding coil L10$b$ is connected to the switch SW104. In this embodiment, the ON/OFF operation of the switches SW101 to SW104 of the switching unit SW100 is controlled by the control unit CONT100 in accordance with a signal from the communication unit COM1 described below. Specifically, when controlling the switches SW101 and SW102 to be in an ON state, the control unit CONT100 controls the switches SW103 and SW104 to be in an OFF state, and, when controlling the switches SW101 and SW102 to be in an OFF state, the control unit CONT100 controls the switches SW103 and SW104 to be in an ON state. In other words, when the switches SW101 and SW102 are brought into an ON state by the control unit CONT100, an alternating-current current is supplied from the drive unit INV to the power feeding coil L10$a$, during which the switches SW103 and SW104 are in an OFF state. Thus, no alternating-current current is supplied from the drive unit INV to the power feeding coil L10$b$. On the other hand, when the switches SW103 and SW104 are brought into an ON state by the control unit CONT100, an alternating-current current is supplied from the drive unit INV to the power feeding coil Ll0$b$, during which the switches SW101 and SW102 are in an OFF state. Thus, no alternating-current current is supplied from the drive unit INV to the power feeding coil L10a. That is, the selection unit SEL100 selects a coil to which power is supplied from among the plurality of power feeding coils L10, and power is supplied from the drive unit INV to the coil selected by the selection unit SEL100. The switches SW101 to SW104 may each be a relay of a mechanical switch or a semiconductor switch.

The communication unit COM1 transmits information by communicating with a communication unit COM2. Specifically, the communication unit COM1 receives information on the relative positions of the power feeding coil unit L1 and a power receiving coil unit L2 from the communication unit COM2 described below, and transmits a signal to the control unit CONT100. Accordingly, the control unit CONT100 controls the ON/OFF states of the switches SW101 to SW104 of the switching unit SW100, in accordance with the signal from the communication unit COM1, so that a power feeding coil relatively closer to the power receiving coil unit L2 among the power feeding coil L10a and the power feeding coil L10b of the power feeding coil unit L1 is selected. In this embodiment, the relative position of the power feeding coil L10a is closer to the power receiving coil unit L2 than that of the power feeding coil L10b. Thus, the control unit CONT100 controls the switches SW101 and SW102 of the switching unit SW100 to be in an ON state, and the switches SW103 and SW104 to be in an OFF state. The determination standard by which the control unit CONT100 controls the ON/OFF states of the switches SW101 to SW104 of the switching unit SW100 is not limited to the control based on the signal from the communication unit COM1 described above, and the control may be based on, for example, a signal from a detection sensor (not illustrated) in the power feeding device 100 which detects the relative positions of or magnetic coupling between the power feeding coil unit L1 and the power receiving coil unit L2. In this configuration, communication between the power feeding device 100 and the power receiving device 200 can be omitted.

The power receiving device 200 includes the power receiving coil unit L2, a rectifier circuit REC, a load R, and the communication unit COM2. As in this embodiment, in a case where the non-contact power transmission device S1 is applied to a power feeding facility for a moving object such as an electric vehicle, the power receiving device 200 is installed in the moving object. Examples of the moving object in which the power receiving device 200 is installable include an electric vehicle that uses electric power from a secondary battery, and a plug-in hybrid electric vehicle.

The power receiving coil unit L2 functions as a power receiving unit that receives the alternating-current power fed from the power feeding coil unit L1 in a non-contact fashion. In this embodiment, in the power receiving coil unit L2, a wire is wound around a magnetic body L2c to construct a power receiving coil L2a. The magnetic body L2c has a substantially rectangular parallelepiped shape, and is preferably configured such that, in terms of the highest magnetic coupling between a power feeding coil and a power receiving coil, the dimension of the magnetic body L2c in the longitudinal direction is substantially equal to the dimension of the magnetic body unit C of the power feeding coil unit L1 in the longitudinal direction and the dimension of the magnetic body L2c in the transverse direction is substantially equal to the dimension of the magnetic body unit C of the power feeding coil unit L1 in the transverse direction. The power receiving coil unit L2 is installed in a lower part of a vehicle such as an electric vehicle.

The rectifier circuit REC rectifies the alternating-current power received by the power receiving coil unit L2 into direct-current power, and supplies the direct-current power to the load R. The rectifier circuit REC is constituted by, for example, a bridge diode and a smoothing capacitor (not illustrated). The alternating-current voltage output from the power receiving coil unit L2 is full-wave rectified by the bridge diode, and further the smoothing capacitor smooths a full-wave rectified pulsating current to form a direct-current voltage. The load R is constituted by, when the non-contact power transmission device S1 is applied to a power feeding facility for a moving object such as an electric vehicle, a charger (not illustrated) installed in the moving object, and a battery (not illustrated). The charger functions to control charging to charge the battery with the direct-current power obtained as a result of the rectification by the rectifier circuit REC based on constant-current constant-voltage (CCCV charging), and the battery is not limited to a particular type so long as it has a function of storing electric power, examples of which include a secondary battery (such as a lithium ion battery, a lithium polymer battery, and a nickel hydrogen battery) and a capacitive element (such as an electric double layer capacitor).

The communication unit COM2 has a function of detecting the relative positions of the power feeding coil unit L1 and the power receiving coil unit L2 and transmitting information to the communication unit COM1. The sensor described above for detecting the relative positions may be, for example, a means for detecting the relative positions by using the magnetic coupling between each of the power feeding coils L10a and L10b of the power feeding coil unit L1 and the power receiving coil unit L2, or may be a means for detecting the relative positions by using an optical means such as a camera. The communication units COM1 and COM2 may perform optical communication using modulated light, ultrasonic communication using modulated ultrasonic waves, or radio wave communication using modulated radio waves.

With the configuration described above, the non-contact power transmission device S1 in which power is transmitted from the power feeding device 100 to the power receiving device 200 in a non-contact fashion is achieved.

Figure 3:
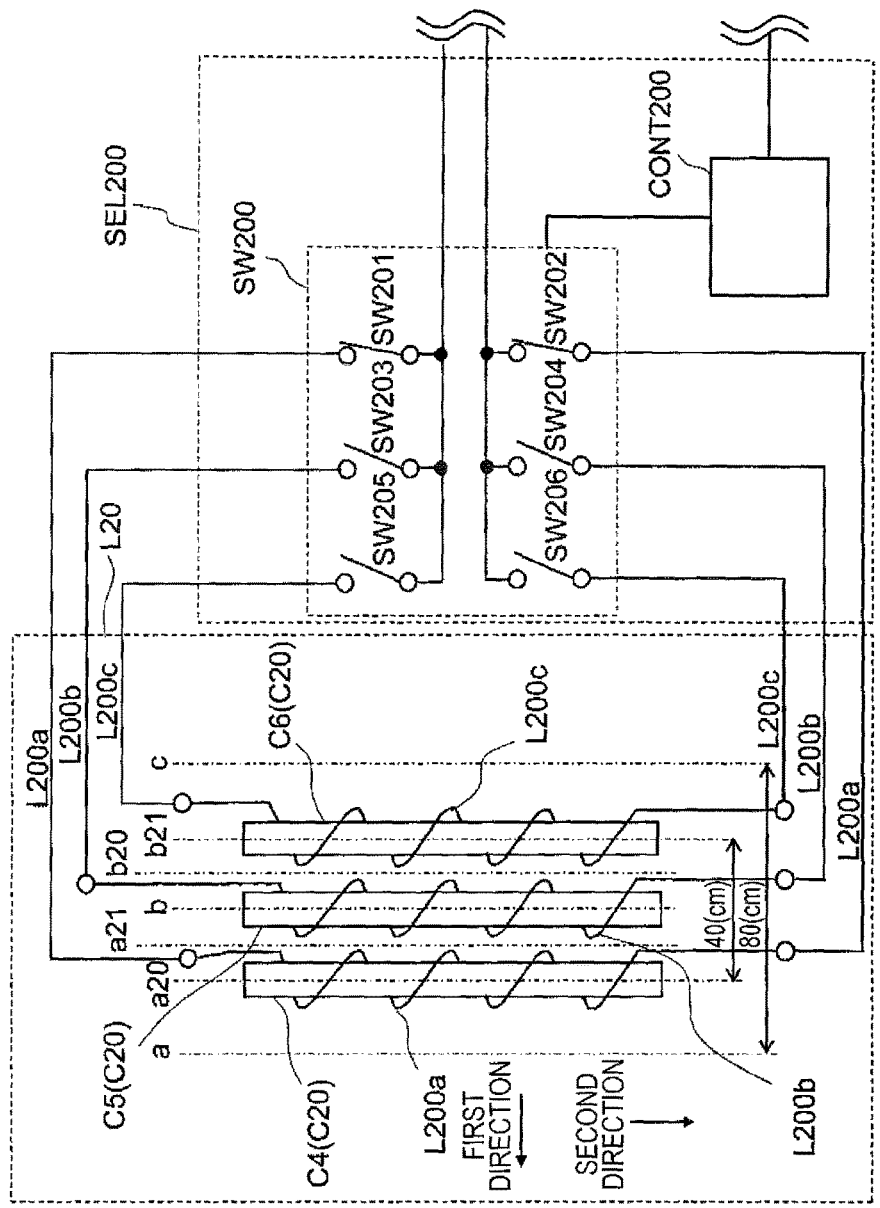
FIG. 3 is a partial enlarged view of a power feeding coil unit and a selection unit in a conventional non-contact power transmission device.

Next, before the description of the power feeding operation of the non-contact power transmission device S1 according to the first embodiment of the present invention, the power feeding operation of a conventional non-contact power transmission device will be described. The conventional non-contact power transmission device is different from the non-contact power transmission device S1 according to the first embodiment of the present invention in that, instead of the power feeding coil unit L1 and the selection unit SEL100 in the non-contact power transmission device S1, a power feeding coil unit L20 and a selection unit SEL200 are included, and the other configuration is similar to that of the non-contact power transmission device S1 according to the first embodiment of the present invention. First, the configuration of the power feeding coil unit L20 and the selection unit SEL200 in the conventional non-contact power transmission device will be described with reference to FIG. 3. FIG. 3 is a partial enlarged view of a power feeding coil unit and a selection unit in the conventional non-contact power transmission device.

The conventional power feeding coil unit L20 includes a magnetic body unit C20 and a plurality of power feeding coils L200. In the magnetic body unit C20, three magnetic bodies C4, C5, and C6 are arranged to be spaced apart in a first direction, and the plurality of power feeding coils L200 include a power feeding coil L200a, a power feeding coil L200b, and a power feeding coil L200c which are located adjacently in the first direction. The power feeding coil L200a is formed of a wire wound around only the magnetic body C4, and one end of the power feeding coil L200a is connected to a switch SW201 of a switching unit SW200 while the other end of the power feeding coil L200a is connected to a switch SW202 of the switching unit SW200. Similarly, the power feeding coil L200b is formed of a wire wound around only the magnetic body C5, and one end of the power feeding coil L200b is connected to a switch SW203 of the switching unit SW200 while the other end of the power feeding coil L200b is connected to a switch SW204 of the switching unit SW200. Similarly, the power feeding coil L200c is formed of a wire wound around only the magnetic body C6, and one end of the power feeding coil L200c is connected to a switch SW205 of the switching unit SW200 while the other end of the power feeding coil L200c is connected to a switch SW206 of the switching unit SW200. Further, a control unit CONT200 of the selection unit SEL200 controls the ON/OFF operation of the switches SW201 to SW206 of the switching unit SW200. That is, the conventional power feeding coil unit L20 is of a type that does not include a magnetic body around which the wires of the power feeding coil L200a, the power feeding coil L200b, and the power feeding coil L200c are wound in common.

Then, the power feeding operation of the conventional non-contact power transmission device will be described. In FIG. 3, a center line of the magnetic body C4 is represented by a20, a center line of the magnetic body C5 by b, a center line between the center line a20 and the center line b by a21, a center line of the magnetic body C6 by b21, and a center line between the center line b and the center line b21 by b20. Further, the distance from the center line b21 to the center line a20 in the first direction is set to 40 (cm), and the distance, centered at the center line b, from a straight line c to a straight line a in the first direction is set to 80 (cm). Furthermore, a center line of the magnetic body L2c in the power receiving coil unit L2 is represented by O.

In the conventional non-contact power transmission device, a power feeding operation is performed with the movement of the power receiving device 200 in the first direction in such a manner that the power receiving coil L2a faces the power feeding coil L200c, the power feeding coil L200b, and the power feeding coil L200a in this order. In this case, when the center line O of the magnetic body L2c in the power receiving coil unit L2 is located in a range from the center line b21 of the magnetic body C6 to the center line b20, the distance between the power receiving coil L2a and the power feeding coil L200c is relatively shorter than the distance between the power receiving coil L2a and the power feeding coil L200b and the distance between the power receiving coil L2a and the power feeding coil L200a. Thus, the power feeding coil L200c is selected, and the control unit CONT200 performs control so that the switches SW205 and SW206 of the switching unit SW200 are brought into an ON state and the switches SW201, SW202, SW203, and SW204 of the switching unit SW200 are brought into an OFF state. Then, when the center line O of the magnetic body L2c in the power receiving coil unit L2 is located in a range exceeding the center line b20 and up to the center line a21, the distance between the power receiving coil L2a and the power feeding coil L200b is relatively shorter than the distance between the power receiving coil L2a and the power feeding coil L200a and the distance between the power receiving coil L2a and the power feeding coil L200c. Thus, the power feeding coil L200b is selected, and the control unit CONT200 performs control so that the switches SW203 and SW204 of the switching unit SW200 are brought into an ON state and the switches SW201, SW202, SW205, and SW206 of the switching unit SW200 are brought into an OFF state. Then, when the center line O of the magnetic body L2c in the power receiving coil unit L2 is located in a range exceeding the center line a21 and up to the center line a20, the distance between the power receiving coil L2a and the power feeding coil L200a is relatively shorter than the distance between the power receiving coil L2b and the power feeding coil L200b and the distance between the power receiving coil L2b and the power feeding coil L200c. Thus, the power feeding coil L200a is selected, and the control unit CONT200 performs control so that the switches SW201 and SW202 of the switching unit SW200 are brought into an ON state and the switches SW203, SW204, SW205, and SW206 of the switching unit SW200 are brought into an OFF state.

Figure 4:
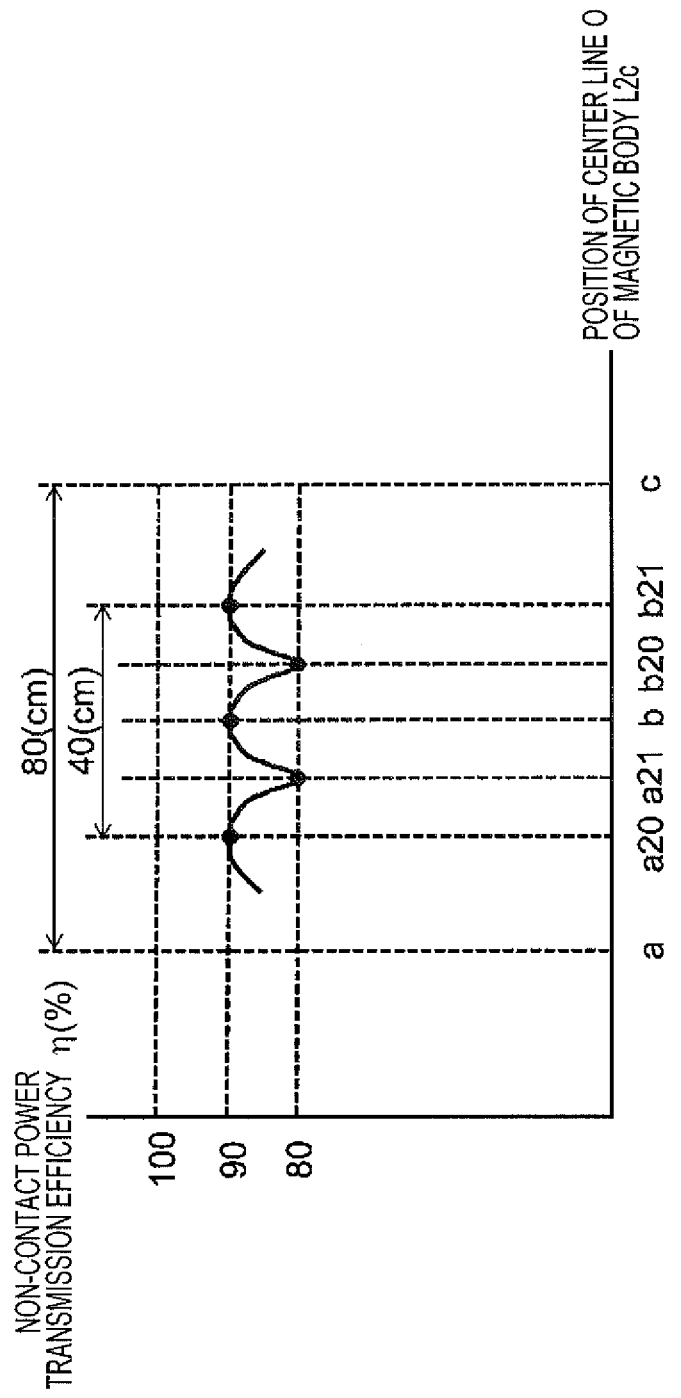
FIG. 4 is a diagram illustrating non-contact power transmission efficiency η based on the relative positional relationship between a power feeding coil and a power receiving coil in the conventional non-contact power transmission device.

The non-contact power transmission efficiency in the power feeding operation of the conventional non-contact power transmission device described above is illustrated in FIG. 4. FIG. 4 is a diagram illustrating non-contact power transmission efficiency η based on the relative positional relationship between a power feeding coil and a power receiving coil in the conventional non-contact power transmission device. The non-contact power transmission efficiency η [%] is determined by dividing the power [kW] received by a load of a power receiving device by the power [kW] consumed by a power supply of a power feeding device and multiplying the result by 100. As illustrated in FIG. 4, when the position of the center line O of the magnetic body L2c in the power receiving coil unit L2 overlaps that of the center line b21 of the magnetic body C6, the magnetic coupling between the power receiving coil L2a and the power feeding coil L200c is high, and thus the non-contact power transmission efficiency η [%] is as high as 90%. When the position of the center line O of the magnetic body L2c in the power receiving coil unit L2 overlaps that of the center line b20, the magnetic coupling between the power receiving coil L2a and the power feeding coil L200c is low, and thus the non-contact power transmission efficiency η [%] is reduced to 80%, which is not preferable. When the position of the center line O of the magnetic body L2c in the power receiving coil unit L2 overlaps that of the center line b of the magnetic body C5, the magnetic coupling between the power receiving coil L2a and the power feeding coil L200b is high, and thus the non-contact power transmission efficiency η [%] is as high as 90%. When the position of the center line O of the magnetic body L2c in the power receiving coil unit L2 overlaps that of the center line a21, the magnetic coupling between the power receiving coil L2a and the power feeding coil L200b is low, and thus the non-contact power transmission efficiency η [%] is reduced to 80%, which is not preferable. Further, when the position of the center line O of the magnetic body L2c in the power receiving coil unit L2 overlaps that of the center line a20 of the magnetic body C4, the magnetic coupling between the power receiving coil L2a and the power feeding coil L200a is high, and thus the non-contact power transmission efficiency η [%] is as high as 90%. Accordingly, the conventional non-contact power transmission device has a problem in that high non-contact power transmission efficiency is not maintainable when the power receiving coil L2a is located between the power feeding coil L200a and the power feeding coil L200b and between the power feeding coil L200b and the power feeding coil L200c. That is, it can be understood that non-contact power transmission efficiency greatly depends on the relative positional relationships between the power receiving coil L2a and the plurality of power feeding coils L200 within the range (40 cm) from the center line b21 of the magnetic body C6 to the center line a20 of the magnetic body C4 in the first direction.

Next, the power feeding operation of the non-contact power transmission device S1 according to the first embodiment of the present invention will be described. In FIG. 2, a center line of the magnetic body C1 is represented by a1, a center line of the magnetic body C2 by b, a center line between the center line a1 and the center line b by a2, a center line of the magnetic body C3 by b2, and a center line between the center line b and the center line b2 by b1. Further, the distance from the center line b2 of the magnetic body C3 to the center line a1 of the magnetic body C1 in the first direction is set to 40 (cm), and the distance, centered at the center line b of the magnetic body C2, from a straight line c to a straight line a in the first direction is set to 80 (cm). Furthermore, a center line of the magnetic body L2c in the power receiving coil unit L2 is represented by O.

In the non-contact power transmission device S1 according to the first embodiment of the present invention, a power feeding operation is performed with the movement of the power receiving device 200 in the first direction in such a manner that the power receiving coil L2a faces the power feeding coil L10b and the power feeding coil L10a in this order. In this case, when the center line O of the magnetic body L2c in the power receiving coil unit L2 is located in a range from the center line b2 of the magnetic body C3 to the center line b of the magnetic body C2, the distance between the power receiving coil L2a and the power feeding coil L10b is relatively shorter than the distance between the power receiving coil L2a and the power feeding coil L10a. Thus, the power feeding coil L10b is selected, and the control unit CONT100 performs control so that the switches SW103 and SW104 of the switching unit SW100 are brought into an ON state and the switches SW101 and SW102 of the switching unit SW100 are brought into an OFF state. On the other hand, when the center line O of the magnetic body L2c in the power receiving coil unit L2 is located in a range exceeding the center line b of the magnetic body C2 and up to the center line a1 of the magnetic body C1, the distance between the power receiving coil L2a and the power feeding coil L10a is relatively shorter than the distance between the power receiving coil L2a and the power feeding coil L10b. Thus, the power feeding coil L10a is selected, and the control unit CONT100 performs control so that the switches SW101 and SW102 of the switching unit SW100 are brought into an ON state and the switches 103 and SW104 of the switching unit SW100 are brought into an OFF state. Note that, when the center line O of the magnetic body L2c in the power receiving coil unit L2 overlaps the center line b of the magnetic body C2, the distance between the power receiving coil L2a and the power feeding coil L10a is equal to the distance between the power receiving coil L2a and the power feeding coil L10b, and thus either of the power feeding coil L10a and the power feeding coil L10b may be selected.

Figure 5:
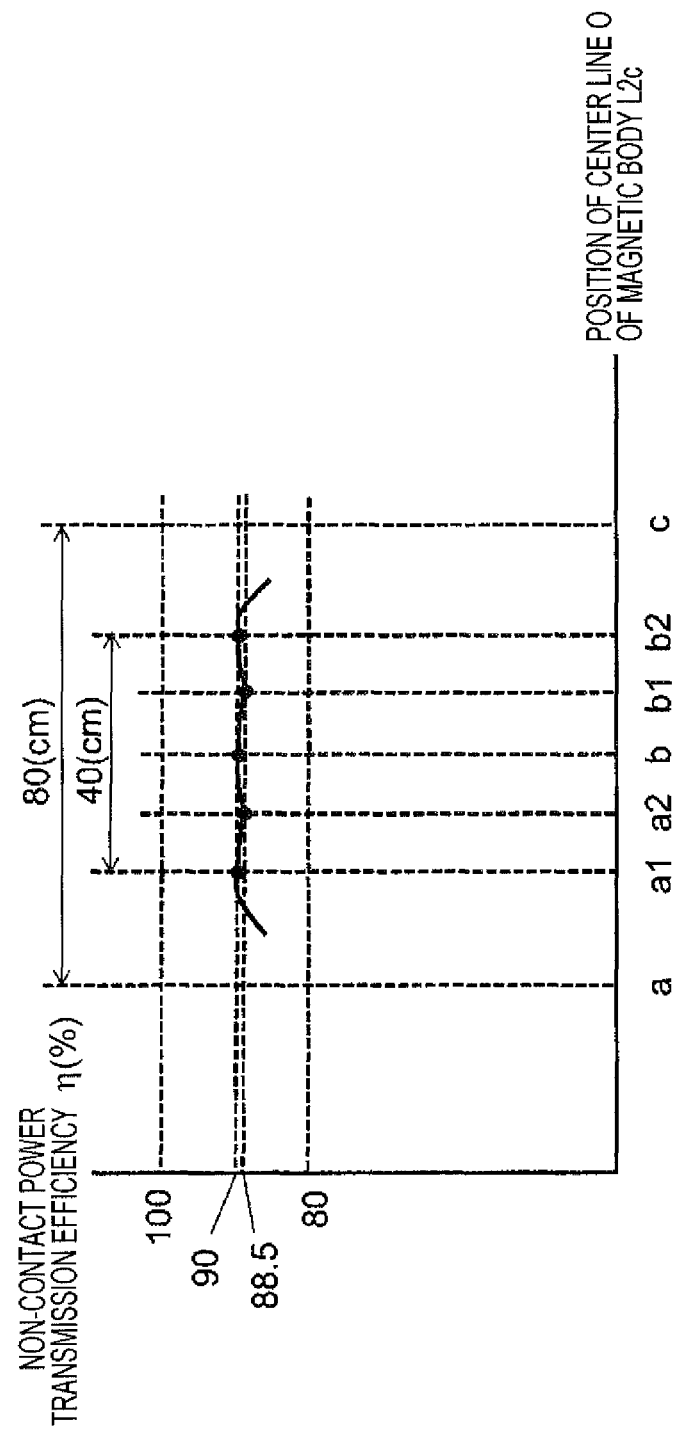
FIG. 5 is a diagram illustrating non-contact power transmission efficiency η based on the relative positional relationship between a power feeding coil and a power receiving coil in the non-contact power transmission device according to the first embodiment of the present invention.

The non-contact power transmission efficiency in the power feeding operation of the non-contact power transmission device according to the first embodiment of the present invention described above is illustrated in FIG. 5. FIG. 5 is a diagram illustrating non-contact power transmission efficiency η based on the relative positional relationship between a power feeding coil and a power receiving coil in the non-contact power transmission device according to the first embodiment of the present invention. The non-contact power transmission efficiency η [%] is determined by dividing the power [kW] received by a load of a power receiving device by the power [kW] consumed by a power supply of a power feeding device and multiplying the result by 100. As illustrated in FIG. 5, when the position of the center line O of the magnetic body L2c in the power receiving coil unit L2 overlaps that of the center line b2 of the magnetic body C3, the magnetic coupling between the power receiving coil L2a and the power feeding coil L10b is high, and thus the power transmission efficiency η [%] is as high as 90%. When the position of the center line O of the magnetic body L2c in the power receiving coil unit L2 overlaps that of the center line b1, the magnetic coupling between the power receiving coil L2a and the power feeding coil L10b is high, and thus the non-contact power transmission efficiency η [%] is as high as 88.5%. When the position of the center line O of the magnetic body L2c in the power receiving coil unit L2 overlaps that of the center line b of the magnetic body C2, the magnetic coupling between the power receiving coil L2a and the power feeding coil L10b is high, and thus the non-contact power transmission efficiency η [%] is as high as 90%. When the position of the center line O of the magnetic body L2c in the power receiving coil unit L2 overlaps that of the center line a2, the magnetic coupling between the power receiving coil L2a and the power feeding coil L10b is high, and thus the non-contact power transmission efficiency η [%] is as high as 88.5%. Further, when the position of the center line O of the magnetic body L2c in the power receiving coil unit L2 overlaps that of the center line a1 of the magnetic body C1, the magnetic coupling between the power receiving coil L2a and the power feeding coil L10a is high, and thus the non-contact power transmission efficiency η [%] is as high as 90%. Accordingly, in the non-contact electric transmission device according to the first embodiment of the present invention, it can be understood that high non-contact power transmission efficiency is maintainable within the range (40 cm) from the center line b2 of the magnetic body C3 to the center line a1 of the magnetic body C1 in the first direction without any dependence on the relative positional relationships between the power receiving coil L2a and the plurality of power feeding coils L10.

As described above, in the non-contact power transmission device S1 according to this embodiment, the power feeding coil unit L1 includes the magnetic body unit C in which at least the three magnetic bodies C1 to C3 are arranged to be spaced apart in a first direction, and the plurality of power feeding coils L10, each formed of a wire wound around at least two magnetic bodies in the magnetic body unit C, and the plurality of power feeding coils L10, which are located adjacently in the first direction, are configured such that the wires of the plurality of power feeding coils L10 are wound in common around one or more magnetic bodies, the number of which is less than the number of magnetic bodies around which the wires of the respective power feeding coils L10a and L10b are wound. This enables the overlap of parts of regions of the power feeding coils L10a and L10b where power can be fed. Thus, a region with the reduced efficiency of power transmission from the power feeding device 100 to the power receiving device 200 can be reduced, enabling high power transmission efficiency to be maintained even if any displacement occurs in the relative positions of each of the power feeding coils L10a and L10b among the plurality of power feeding coils L10 and the power receiving coil L2a.

In the non-contact power transmission device S1 according to this embodiment, furthermore, the wires of the plurality of power feeding coils L10 are arranged alternately in a second direction perpendicular to the first direction around the magnetic body C2 around which the wires are wound in common. This can suppress an imbalance between regions of the power feeding coils L10a and L10b where power can be fed. Consequently, a region with the reduced efficiency of power transmission from the power feeding device 100 to the power receiving device 200 can further be reduced, enabling expansion of the range over which power transmission efficiency can be maintained even if any displacement occurs in the relative positions of each of the power feeding coils L10a and L10b among the plurality of power feeding coils L10 and the power receiving coil L2a.

Modified Example of First Embodiment

Figure 6:
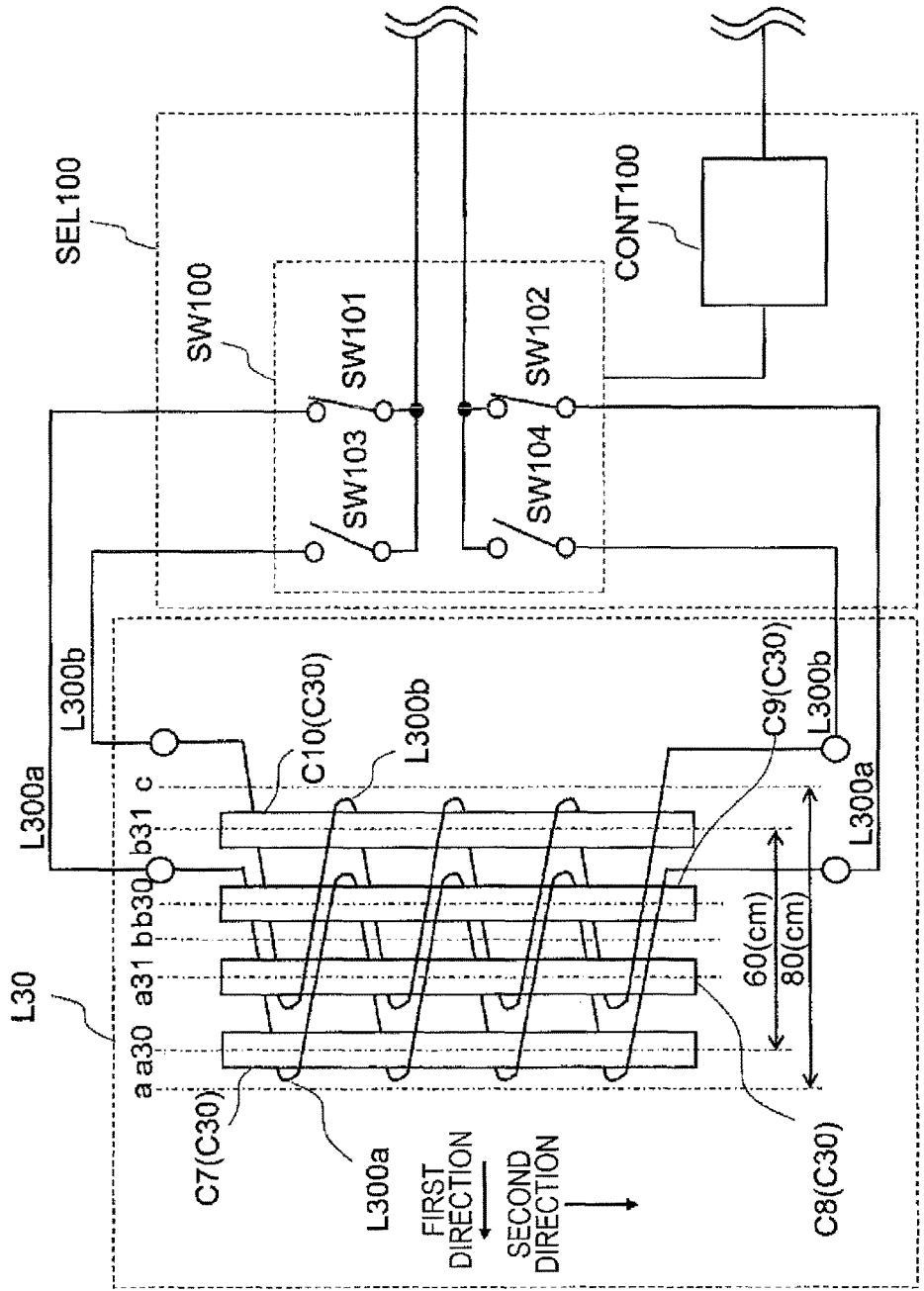
FIG. 6 is a partial enlarged view of a power feeding coil unit and a selection unit of a non-contact power transmission device according to a modified example of the first embodiment of the present invention, which corresponds to the partial enlarged view of the power feeding coil unit and the selection unit illustrated in FIG. 2 in the non-contact power transmission device according to a modified example of the first embodiment of the present invention.

Next, the overall configuration of a non-contact power transmission device according to a modified example of the first embodiment of the present invention will be described with reference to FIG. 6. FIG. 6 is a partial enlarged view of a power feeding coil unit and a selection unit of a non-contact power transmission device according to a modified example of the first embodiment of the present invention, which corresponds to the partial enlarged view of the power feeding coil unit and the selection unit illustrated in FIG. 2 in the non-contact power transmission device according to the first embodiment of the present invention. This modified example is different from the non-contact power transmission device S1 according to the first embodiment in that a power feeding coil unit L30 is included in place of the power feeding coil unit L1 of the non-contact power transmission device S1, and the other configuration is similar to that of the non-contact power transmission device S1 according to the first embodiment of the present invention. In the following, the description will be made mainly of the difference from the first embodiment.

The power feeding coil unit L30 includes a magnetic body unit C30 and a plurality of power feeding coils L300. In the magnetic body unit C30, as illustrated in FIG. 6, four magnetic bodies C7 to C10 are arranged to be spaced apart in a first direction. The four magnetic bodies C7 to C10 each have a substantially rectangular parallelepiped shape, and have the same dimensions and shape in this embodiment. In addition, the four magnetic bodies C7 to C10 are arranged such that the longitudinal directions thereof are perpendicular to the first direction and the ends thereof in the respective longitudinal directions are aligned in the first direction. In this embodiment, the magnetic body C7, the magnetic body C8, the magnetic body C9, and the magnetic body C10 are arranged in this order in the first direction, and the interval between the magnetic body C7 and the magnetic body C8, the interval between the magnetic body C8 and the magnetic body C9, and the interval between the magnetic body C9 and the magnetic body C10 are equal. That is, the four magnetic bodies C7 to C10 are arranged in alignment in the first direction. Examples of the magnetic material constituting the four magnetic bodies C7 to C10 include ferrite, permalloy, and silicon steel plate, and the higher the relative magnetic permeability for air, the more preferable. For example, it is preferable that a magnetic material having a direct-current initial permeability of 1000 or more be used. In a case where the alternating-current current supplied from the drive unit INV to the power feeding coil unit L30 has a frequency of several kilohertz (kHz) to several hundreds of kilohertz (kHz), in terms of low core loss in high-frequency domains and the ability to suppress the generation of heat in a magnetic body, the magnetic material constituting the four magnetic bodies C7 to C10 is preferably ferrite, more preferably, for example, Mn—Zn ferrite with a direct-current initial permeability of approximately 1500 to 10000 and a saturation magnetic flux density of approximately 0.35 to 0.4 T. Furthermore, in a case where the frequency of the alternating-current current supplied from the drive unit INV to the power feeding coil unit L30 is a commercial frequency of approximately 50 to 60 Hz, in terms of magnetic saturation being less likely to occur in the low-frequency domain of the commercial frequencies, the magnetic material constituting the four magnetic bodies C7 to C10 is preferably silicon steel plate, more preferably, for example, silicon steel plate with a direct-current initial permeability of approximately 1000 to 3000 and a saturation magnetic flux density of approximately 1.8 to 2 T. In this embodiment, the magnetic body unit C30 is constituted by the four magnetic bodies C7 to C10, which is not limited thereto, and it is sufficient that the magnetic body unit C30 includes at least the four magnetic bodies C7 to C10.

As illustrated in FIG. 6, the plurality of power feeding coils L300 include a power feeding coil L300a and a power feeding coil L300b which are located adjacently in the first direction. Specifically, the power feeding coil L300a is formed of a wire wound around three magnetic bodies of the magnetic body unit C30, namely, the magnetic bodies C7, C8, and C9, and the power feeding coil L300b is formed of a wire wound around three magnetic bodies of the magnetic body unit C30, namely, the magnetic bodies C8, C9, and C10. In this embodiment, the wires of the power feeding coil L300a and the power feeding coil L300b are wound in common around the two magnetic bodies C8 and C9. That is, the number of magnetic bodies (two magnetic bodies) around which the wire of the power feeding coil L300a and the wire of the power feeding coil L300b are wound in common is smaller than the number of magnetic bodies (four magnetic bodies) around which the wires of the power feeding coil L300a and the power feeding coil L300b are wound, and a plurality of (two) magnetic bodies around which the wires of the plurality of power feeding coils L300 are wound in common are provided. In addition, the wires of the power feeding coil L300a and the power feeding coil L300b are arranged alternately in a second direction perpendicular to the first direction around the magnetic bodies C8 and C9 around which the wires are wound in common. That is, the wire of the power feeding coil L300a and the wire of the power feeding coil L300b do not overlap each other at the magnetic bodies C8 and C9 and are wound so as to be spaced from each other. The intervals at which the wire of the power feeding coil L300a and the wire of the power feeding coil L300b are wound around the magnetic bodies C8 and C9 are preferably equal in the second direction. In this case, an imbalance between a region of the power feeding coil L300a where power can be fed and a region of the power feeding coil L300b where power can be fed can be suppressed. Examples of the wires constituting the power feeding coil L300a and the power feeding coil L300b include a Litz wire made by twisting together multiple metal wires such as copper or aluminum wires. Further, the numbers of turns of the power feeding coil L300a and the power feeding coil L300b are set as appropriate based on the desired power transmission efficiency. Preferably, the power feeding coil L300a and the power feeding coil L300b are composed of metal wires of the same material and have the same number of turns, in terms of making the amounts of magnetic flux generated by the current flowing through the coils equal. In the power feeding coils L300a and L300b having the configuration described above, one end of the power feeding coil L300a is connected to the switch SW101 and the other end of the power feeding coil L300a is connected to the switch SW102, and one end of the power feeding coil L300b is connected to the switch SW103 and the other end of the power feeding coil L300b is connected to the switch SW104.

Next, the power feeding operation of the non-contact power transmission device according to the modified example of the first embodiment of the present invention will be described. In FIG. 6, a center line of the magnetic body C7 is represented by a30, a center line of the magnetic body C8 by a31, a center line of the magnetic body C9 by b30, a center line of the magnetic body C10 by b31, and a center line between the center line a31 of the magnetic body C8 and the center line b30 of the magnetic body C9 by b. Further, the distance from the center line b31 of the magnetic body C10 to the center line a30 of the magnetic body C7 in the first direction is set to 60 (cm), and the distance, centered at the center line b, from a straight line c to a straight line a in the first direction is set to 80 (cm). Furthermore, a center line of the magnetic body L2c in the power receiving coil unit L2 is represented by O.

In the non-contact power transmission device according to the modified example of the first embodiment of the present invention, a power feeding operation is performed with the movement of the power receiving device 200 in the first direction in such a manner that the power receiving coil L2a faces the power feeding coil L300b and the power feeding coil L300a in this order. In this case, when the center line O of the magnetic body L2c in the power receiving coil unit L2 is located in a range from the center line b31 of the magnetic body C10 to the center line b, the distance between the power receiving coil L2a and the power feeding coil L300b is relatively shorter than the distance between the power receiving coil L2a and the power feeding coil L300a. Thus, the power feeding coil L300b is selected, and the control unit CONT100 performs control so that the switches SW103 and SW104 of the switching unit SW100 are brought into an ON state and the switches SW101 and SW102 of the switching unit SW100 are brought into an OFF state. On the other hand, when the center line O of the magnetic body L2c in the power receiving coil unit L2 is located in a range exceeding the center line b and up to the center line a30 of the magnetic body C7, the distance between the power receiving coil L2a and the power feeding coil L300a is relatively shorter than the distance between the power receiving coil L2a and the power feeding coil L300b. Thus, the power feeding coil L300a is selected, and the control unit CONT100 performs control so that the switches SW101 and SW102 of the switching unit SW100 are brought into an ON state and the switches SW103 and SW104 of the switching unit SW100 are brought into an OFF state.

Figure 7:
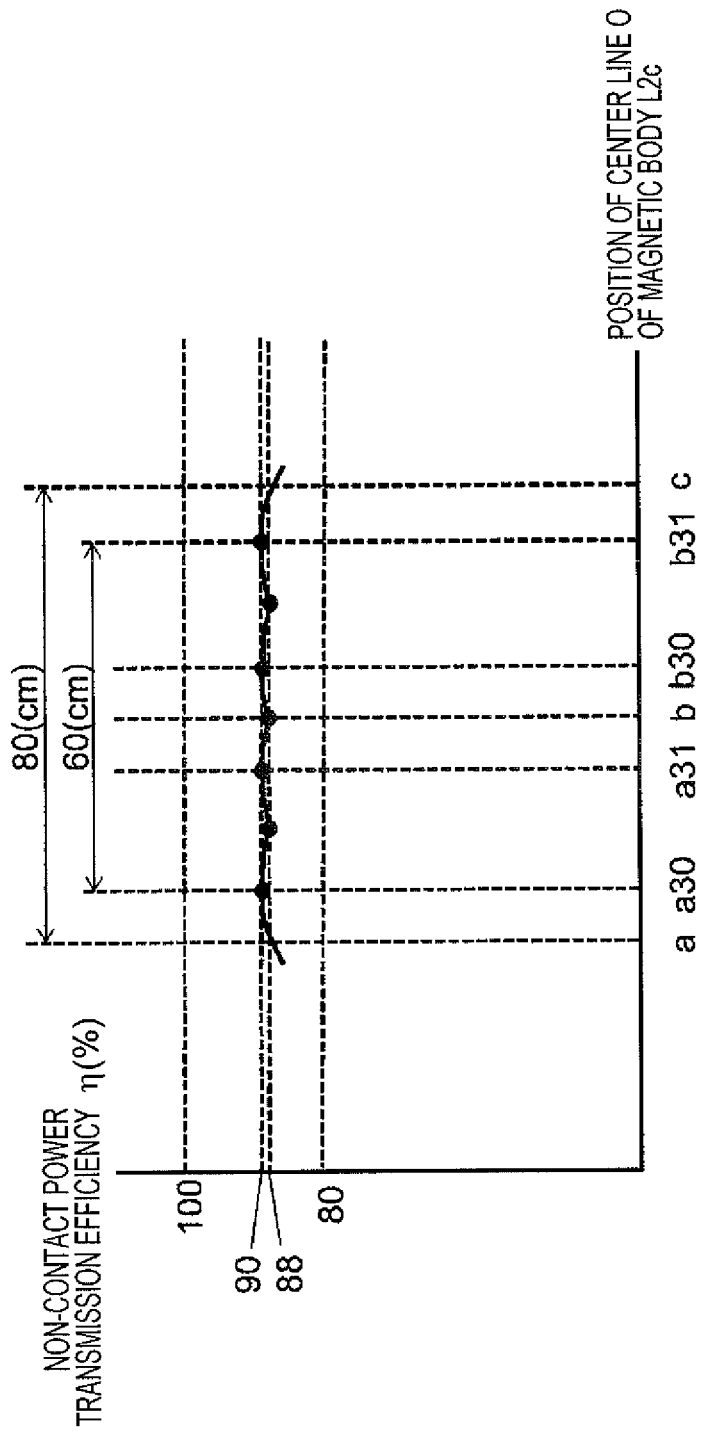
FIG. 7 is a diagram illustrating non-contact power transmission efficiency η based on the relative positional relationship between a power feeding coil and a power receiving coil in the non-contact power transmission device according to the modified example of the first embodiment of the present invention.

The power transmission efficiency in the power feeding operation of the non-contact power transmission device according to the modified example of the first embodiment of the present invention described above is illustrated in FIG. 7. FIG. 7 is a diagram illustrating non-contact power transmission efficiency η based on the relative positional relationship between a power feeding coil and a power receiving coil in the non-contact power transmission device according to the modified example of the first embodiment of the present invention. The non-contact power transmission efficiency η [%] is determined by dividing the power [kW] received by a load of a power receiving device by the power [kW] consumed by a power supply of a power feeding device and multiplying the result by 100. As illustrated in FIG. 7, when the position of the center line O of the magnetic body L2c in the power receiving coil unit L2 overlaps that of the center line b31 of the magnetic body C10, the magnetic coupling between the power receiving coil L2a and the power feeding coil L300b is high, and thus the non-contact power transmission efficiency η [%] is as high as 90%. When the position of the center line O of the magnetic body L2c in the power receiving coil unit L2 is around the middle between the center line b31 of the magnetic body C10 and the center line b30 of the magnetic body C9, the magnetic coupling between the power receiving coil L2a and the power feeding coil L300b is high, and thus the non-contact power transmission efficiency η [%] is as high as 88%. When the position of the center line O of the magnetic body L2c in the power receiving coil unit L2 overlaps that of the center line b30 of the magnetic body C9, the magnetic coupling between the power receiving coil L2a and the power feeding coil L300b is high, and thus the non-contact power transmission efficiency η [%] is as high as 90%. When the position of the center line O of the magnetic body L2c in the power receiving coil unit L2 overlaps that of the center line b, the magnetic coupling between the power receiving coil L2a and the power feeding coil L300b is high, and thus the non-contact power transmission efficiency η [%] is as high as 88%. When the position of the center line O of the magnetic body L2c in the power receiving coil unit L2 overlaps that of the center line a31 of the magnetic body C8, the magnetic coupling between the power receiving coil L2a and the power feeding coil L300a is high, and thus the non-contact power transmission efficiency η [%] is as high as 90%. When the position of the center line O of the magnetic body L2c in the power receiving coil unit L2 is around the middle between the center line a31 of the magnetic body C8 and the center line a30 of the magnetic body C7, the magnetic coupling between the power receiving coil L2a and the power feeding coil L300a is high, and thus the non-contact power transmission efficiency η [%] is as high as 88%. Further, when the position of the center line O of the magnetic body L2c in the power receiving coil unit L2 overlaps that of the center line a30 of the magnetic body C7, the magnetic coupling between the power receiving coil L2a and the power feeding coil L300a is high, and thus the non-contact power transmission efficiency η [%] is as high as 90%. Accordingly, in the non-contact electric transmission device according to the modified example of the first embodiment of the present invention, it can be understood that high power transmission efficiency is maintainable within an expanded power feeding region from the center line b31 of the magnetic body C10 to the center line a30 of the magnetic body C7 in the first direction without any dependence on the relative positional relationships between the power receiving coil L2a and the plurality of power feeding coils L300.

As described above, in the non-contact power transmission device according to this modified example, the power feeding coil unit L30 includes the magnetic body unit C30 in which the four magnetic bodies C7 to C10 are arranged to be spaced apart in a first direction, and the plurality of power feeding coils L300, each formed of a wire wound around three magnetic bodies of the magnetic body unit C30, and the plurality of power feeding coils L300, which are located adjacently in the first direction, are configured such that the wires of the plurality of power feeding coils L300 are wound in common around one or more magnetic bodies, the number of which is less than the number of magnetic bodies around which the wires of the respective power feeding coils L300a and L300b are wound. This enables the overlap of parts of regions of the power feeding coils L300a and L300b where power can be fed. Thus, a region with the reduced efficiency of power transmission from the power feeding device 100 to the power receiving device 200 can be reduced, enabling high power transmission efficiency to be maintained even if any displacement occurs in the relative positions of each of the power feeding coils L300a and L300b among the plurality of power feeding coils L300 and the power receiving coil L2a.

In the non-contact power transmission device according to this modified example, furthermore, the wires of the plurality of power feeding coils L300 are arranged alternately in a second direction perpendicular to the first direction around the magnetic body C8 around which the wires are wound in common. This can suppress an imbalance between regions of the power feeding coils L300a and L300b where power can be fed. Consequently, a region with the reduced efficiency of power transmission from the power feeding device 100 to the power receiving device 200 can further be reduced, enabling expansion of the range over which power transmission efficiency can be maintained even if any displacement occurs in the relative positions of each of the power feeding coils L300a and L300b among the plurality of power feeding coils L300 and the power receiving coil L2a.

Second Embodiment

Figure 8:
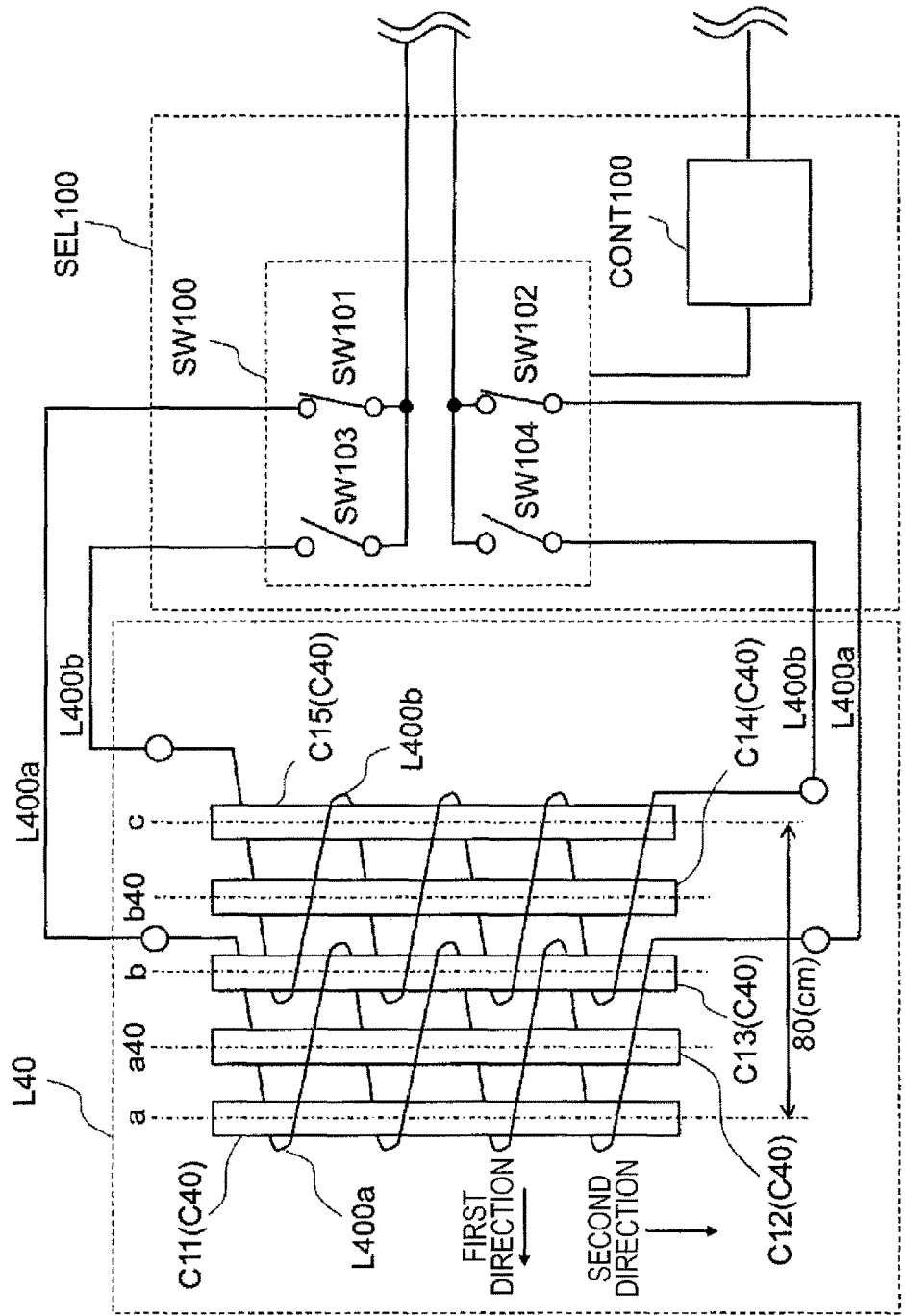
FIG. 8 is a partial enlarged view of a power feeding coil unit and a selection unit of a non-contact power transmission device according to a second embodiment of the present invention, which corresponds to the partial enlarged view of the power feeding coil unit and the selection unit illustrated in FIG. 2 in the non-contact power transmission device according to the first embodiment of the present invention.

Next, the overall configuration of a non-contact power transmission device according to a second embodiment of the present invention will be described with reference to FIG. 8. FIG. 8 is a partial enlarged view of a power feeding coil unit and a selection unit of a non-contact power transmission device according to the second embodiment of the present invention, which corresponds to the partial enlarged view of the power feeding coil unit and the selection unit illustrated in FIG. 2 in the non-contact power transmission device according to the first embodiment of the present invention. This embodiment is different from the non-contact power transmission device S1 according to the first embodiment of the present invention in that a power feeding coil unit L40 is included in place of the power feeding coil unit L1 of the non-contact power transmission device S1, and the other configuration is similar to that of the non-contact power transmission device S1 according to the first embodiment of the present invention. In the following, the description will be made mainly of the difference from the first embodiment.

The power feeding coil unit L40 includes a magnetic body unit C40 and a plurality of power feeding coils L400. In the magnetic body unit C40, as illustrated in FIG. 8, five magnetic bodies C11 to C15 are arranged to be spaced apart in a first direction. The five magnetic bodies C11 to C15 each have a substantially rectangular parallelepiped shape, and have the same dimensions and shape in this embodiment. In addition, the five magnetic bodies C11 to C15 are arranged such that the longitudinal directions thereof are perpendicular to the first direction and the ends thereof in the respective longitudinal directions are aligned in the first direction. In this embodiment, the magnetic body C11, the magnetic body C12, the magnetic body C13, the magnetic body C14, and the magnetic body C15 are arranged in this order in the first direction, and the interval between the magnetic body C11 and the magnetic body C12, the interval between the magnetic body C12 and the magnetic body C13, the interval between the magnetic body C13 and the magnetic body C14, and the interval between the magnetic body C14 and the magnetic body C15 are equal. That is, the five magnetic bodies C11 to C15 are arranged in alignment in the first direction. Examples of the magnetic material constituting the five magnetic bodies C11 to C15 include ferrite, permalloy, and silicon steel plate, and the higher the relative magnetic permeability for air, the more preferable. For example, it is preferable that a magnetic material having a direct-current initial permeability of 1000 or more be used. In a case where the alternating-current current supplied from the drive unit INV to the power feeding coil unit L40 has a frequency of several kilohertz (kHz) to several hundreds of kilohertz (kHz), in terms of low core loss in high-frequency domains and the ability to suppress the generation of heat in a magnetic body, the magnetic material constituting the five magnetic bodies C11 to C15 is preferably ferrite, more preferably, for example, Mn—Zn ferrite with a direct-current initial permeability of approximately 1500 to 10000 and a saturation magnetic flux density of approximately 0.35 to 0.4 T. Furthermore, in a case where the frequency of the alternating-current current supplied from the drive unit INV to the power feeding coil unit L40 is a commercial frequency of approximately 50 to 60 Hz, in terms of magnetic saturation being less likely to occur in the low-frequency domain of the commercial frequencies, the magnetic material constituting the five magnetic bodies C11 to C15 is preferably silicon steel plate, more preferably, for example, silicon steel plate with a direct-current initial permeability of approximately 1000 to 3000 and a saturation magnetic flux density of approximately 1.8 to 2 T. In this embodiment, the magnetic body unit C40 is constituted by the five magnetic bodies C11 to C15, which is not limited thereto, and it is sufficient that the magnetic body unit C40 includes at least the five magnetic bodies C11 to C15.

As illustrated in FIG. 8, the plurality of power feeding coils L400 include a power feeding coil L400a and a power feeding coil L400b which are located adjacently in the first direction. Specifically, the power feeding coil L400a is formed of a wire wound around three magnetic bodies of the magnetic body unit C40, namely, the magnetic bodies C11, C12, and C13, and the power feeding coil L400b is formed of a wire wound around three magnetic bodies of the magnetic body unit C40, namely, the magnetic bodies C13, C14, and C15. In this embodiment, the wires of the power feeding coil L400a and the power feeding coil L400b are wound in common around the single magnetic body C13. That is, the number of magnetic bodies (one magnetic body) around which the wire of the power feeding coil L400a and the wire of the power feeding coil L400b are wound in common is smaller than the number of magnetic bodies (five magnetic bodies) around which the wires of the power feeding coil L400a and the power feeding coil L400b are wound. In this embodiment, additionally, the two magnetic bodies C11 and C12 are magnetic bodies around which only the wire of the power feeding coil L400a is wound, and the two magnetic bodies C14 and C15 are magnetic bodies around which only the wire of the power feeding coil L400b is wound. That is, the plurality of power feeding coils L400a and L400b, which are located adjacently in the first direction, are configured such that the number of magnetic bodies (two magnetic bodies) around which only the wire of one of the plurality of power feeding coils L400a and L400b, namely, the power feeding coil L400a, is wound is larger than the number of magnetic bodies (one magnetic body) around which the wire of the one power feeding coil L400a and the wire of the other power feeding coil L400b are wound in common, and the number of magnetic bodies (two magnetic bodies) around which only the wire of the other power feeding coil L400b is wound is larger than the number of magnetic bodies (one magnetic body) around which the wire of the one power feeding coil L400a and the wire of the other power feeding coil L400b are wound in common. In addition, the wires of the power feeding coil L400a and the power feeding coil L400b are arranged alternately in a second direction perpendicular to the first direction around the magnetic body C13 around which the wires are wound in common. That is, the wire of the power feeding coil L400a and the wire of the power feeding coil L400b do not overlap each other at the magnetic body C13 and are wound so as to be spaced from each other. The intervals at which the wire of the power feeding coil L400a and the wire of the power feeding coil L400b are wound around the magnetic body C13 are preferably equal in the second direction. In this case, an imbalance between a region of the power feeding coil L400a where power can be fed and a region of the power feeding coil L400b where power can be fed can be suppressed. Examples of the wires constituting the power feeding coil L400a and the power feeding coil L400b include a Litz wire made by twisting together multiple metal wires such as copper or aluminum wires. Further, the numbers of turns of the power feeding coil L400a and the power feeding coil L400b are set as appropriate based on the desired power transmission efficiency. Preferably, the power feeding coil L400a and the power feeding coil L400b are composed of metal wires of the same material and have the same number of turns, in terms of making the amounts of magnetic flux generated by the current flowing through the coils equal. In the power feeding coils L400a and L400b having the configuration described above, one end of the power feeding coil L400a is connected to the switch SW101 and the other end of the power feeding coil L400a is connected to the switch SW102, and one end of the power feeding coil L400b is connected to the switch SW103 and the other end of the power feeding coil L400b is connected to the switch SW104.

Next, the power feeding operation of the non-contact power transmission device according to the second embodiment of the present invention will be described. In FIG. 8, a center line of the magnetic body C11 is represented by a, a center line of the magnetic body C12 by a40, a center line of the magnetic body C13 by b, a center line of the magnetic body C14 by b40, and a center line of the magnetic body C15 by c. Further, the distance, centered at the center line b, from a center line c to a center line a in the first direction is set to 80 (cm). Furthermore, a center line of the magnetic body L2c in the power receiving coil unit L2 is represented by O.

In the non-contact power transmission device according to the second embodiment of the present invention, a power feeding operation is performed with the movement of the power receiving device 200 in the first direction in such a manner that the power receiving coil L2a faces the power feeding coil L400b and the power feeding coil L400a in this order. In this case, when the center line O of the magnetic body L2c in the power receiving coil unit L2 is located in a range from the center line c of the magnetic body C15 to the center line b of the magnetic body C13, the distance between the power receiving coil L2a and the power feeding coil L400b is relatively shorter than the distance between the power receiving coil L2a and the power feeding coil L400a. Thus, the power feeding coil L400b is selected, and the control unit CONT100 performs control so that the switches SW103 and SW104 of the switching unit SW100 are brought into an ON state and the switches SW101 and SW102 of the switching unit SW100 are brought into an OFF state. On the other hand, when the center line O of the magnetic body L2c in the power receiving coil unit L2 is located in a range exceeding the center line b of the magnetic body C13 and up to the center line a of the magnetic body C11, the distance between the power receiving coil L2a and the power feeding coil L400a is relatively shorter than the distance between the power receiving coil L2a and the power feeding coil L400b. Thus, the power feeding coil L400a is selected, and the control unit CONT100 performs control so that the switches SW101 and SW102 of the switching unit SW100 are brought into an ON state and the switches SW103 and SW104 of the switching unit SW100 are brought into an OFF state. Note that, when the center line O of the magnetic body L2c in the power receiving coil unit L2 overlaps the center line b of the magnetic body C13, the distance between the power receiving coil L2a and the power feeding coil L400a is equal to the distance between the power receiving coil L2a and the power feeding coil L400b, and thus either of the power feeding coil L400a and the power feeding coil L400b may be selected.

Figure 9:
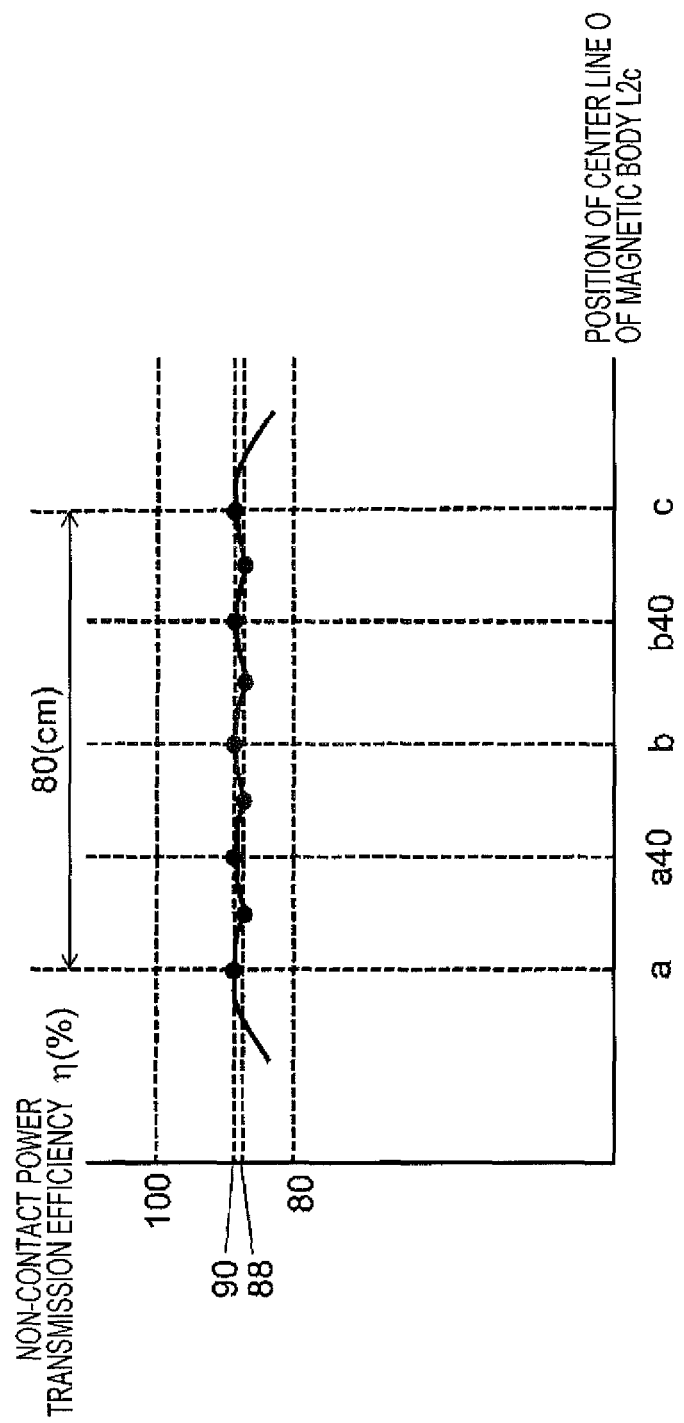
FIG. 9 is a diagram illustrating non-contact power transmission efficiency η based on the relative positional relationship between a power feeding coil and a power receiving coil in the non-contact power transmission device according to the second embodiment of the present invention.

The non-contact power transmission efficiency in the power feeding operation of the non-contact power transmission device according to the second embodiment of the present invention described above is illustrated in FIG. 9. FIG. 9 is a diagram illustrating non-contact power transmission efficiency η based on the relative positional relationship between a power feeding coil and a power receiving coil in the non-contact power transmission device according to the second embodiment of the present invention. The non-contact power transmission efficiency η [%] is determined by dividing the power [kW] received by a load of a power receiving device by the power [kW] consumed by a power supply of a power feeding device and multiplying the result by 100. As illustrated in FIG. 9, when the position of the center line O of the magnetic body L2c in the power receiving coil unit L2 overlaps that of the center line c of the magnetic body C15, the magnetic coupling between the power receiving coil L2a and the power feeding coil L400b is high, and thus the non-contact power transmission efficiency η [%] is as high as 90%. Around the middle between the center line c of the magnetic body C15 and the center line b40 of the magnetic body C14, the magnetic coupling between the power receiving coil L2a and the power feeding coil L400b is high, and thus the non-contact power transmission efficiency η [%] is as high as 88%. When the position of the center line O of the magnetic body L2c in the power receiving coil unit L2 overlaps that of the center line b40 of the magnetic body C14, the magnetic coupling between the power receiving coil L2a and the power feeding coil L400b is high, and thus the non-contact power transmission efficiency η [%] is as high as 90%. Around the middle between the center line b40 of the magnetic body C14 and the center line b of the magnetic body C13, the magnetic coupling between the power receiving coil L2a and the power feeding coil L400b is high, and thus the non-contact power transmission efficiency η [%] is as high as 88%. When the position of the center line O of the magnetic body L2c in the power receiving coil unit L2 overlaps that of the center line b of the magnetic body C13, the magnetic coupling between the power receiving coil L2a and the power feeding coil L400b is high, and thus the non-contact power transmission efficiency η [%] is as high as 90%. Around the middle between the center line b of the magnetic body C13 and the center line a40 of the magnetic body C12, the magnetic coupling between the power receiving coil L2a and the power feeding coil L400a is high, and thus the non-contact power transmission efficiency η [%] is as high as 88%. When the position of the center line O of the magnetic body L2c in the power receiving coil unit L2 overlaps that of the center line a40 of the magnetic body C12, the magnetic coupling between the power receiving coil L2a and the power feeding coil L400a is high, and thus the non-contact power transmission efficiency η [%] is as high as 90%. Around the middle between the center line a40 of the magnetic body C12 and the center line a of the magnetic body C11, the magnetic coupling between the power receiving coil L2a and the power feeding coil L400a is high, and thus the non-contact power transmission efficiency η [%] is as high as 88%. Further, when the position of the center line O of the magnetic body L2c in the power receiving coil unit L2 overlaps that of the center line a of the magnetic body C11, the magnetic coupling between the power receiving coil L2a and the power feeding coil L400a is high, and thus the power transmission efficiency η [%] is as high as 90%. Accordingly, in the non-contact power transmission device according to the second embodiment of the present invention, it is possible to provide an expanded power feeding range of 80 (cm) from the center line c of the magnetic body C15 to the center line a of the magnetic body C11 in the first direction, and it can be understood that high power transmission efficiency is maintainable without any dependence on the relative positional relationships between the power receiving coil L2a and the plurality of power feeding coils L400.

As described above, in the non-contact power transmission device according to this embodiment, the power feeding coil unit L40 includes the magnetic body unit C40 in which the five magnetic bodies C11 to C15 are arranged to be spaced apart in a first direction, and the plurality of power feeding coils L400, each formed of a wire wound around three magnetic bodies of the magnetic body unit C40, and the plurality of power feeding coils L400, which are located adjacently in the first direction, are configured such that the wires of the plurality of power feeding coils L400 are wound in common around one or more magnetic bodies, the number of which is less than the number of magnetic bodies around which the wires of the respective power feeding coils L400a and L400b are wound. This enables the overlap of parts of regions of the power feeding coils L400a and L400b where power can be fed. Thus, a region with the reduced efficiency of power transmission from the power feeding device 100 to the power receiving device 200 can be reduced, enabling high power transmission efficiency to be maintained even if any displacement occurs in the relative positions of each of the power feeding coils L400a and L400b among the plurality of power feeding coils L400 and the power receiving coil L2a.

In the non-contact power transmission device according to this embodiment, furthermore, the wires of the plurality of power feeding coils L400 are arranged alternately in a second direction perpendicular to the first direction around the magnetic body C13 around which the wires are wound in common. This can suppress an imbalance between regions of the power feeding coils L400a and L400b where power can be fed. Consequently, a region with the reduced efficiency of power transmission from the power feeding device 100 to the power receiving device 200 can further be reduced, enabling expansion of the range over which power transmission efficiency can be maintained even if any displacement occurs in the relative positions of each of the power feeding coils L400a and L400b among the plurality of power feeding coils L400 and the power receiving coil L2a.

In the non-contact power transmission device according to this embodiment, additionally, the plurality of power feeding coils L400, which are located adjacently in the first direction, are configured such that the number of magnetic bodies around which only the wire of one of the plurality of power feeding coils L400, namely, the power feeding coil L400a, is wound is larger than the number of magnetic bodies around which the wire of the one power feeding coil L400a and the wire of the other power feeding coil L400b are wound in common. This can further expand regions of the power feeding coils L400a and L400b where power can be fed. Thus, a region with the reduced efficiency of power transmission from the power feeding device 100 to the power receiving device 200 can be reduced, enabling expansion of the range over which power transmission efficiency can be maintained even if any displacement occurs in the relative positions of each of the power feeding coils L400a and L400b among the plurality of power feeding coils L400 and the power receiving coil L2a.

The present invention has been described based on embodiments. The embodiments are illustrative, and it is to be understood by a person skilled in the art that various modifications and changes can be made within the scope of the claims of the present invention and that such modified examples and changes also fall within the scope of the claims of the present invention. The description of the specification and drawings are, accordingly, to be regarded in an illustrative rather than a restrictive sense.

In the embodiments described above, a plurality of power feeding coils and a power receiving coil are arranged such that the axis of each coil is parallel to the ground, which is not limited thereto. For example, as illustrated in FIG. 10, a plurality of power feeding coils and a power receiving coil may be arranged such that the axis of each coil is perpendicular to the ground (vertically). FIG. 10 is a schematic diagram of a non-contact power transmission device according to another application example of the present invention. In FIG. 10, for convenience of illustration, only a power feeding coil unit is illustrated in a power feeding device, and only a power receiving coil unit is illustrated in a power receiving device. In a non-contact power transmission device S50 illustrated in FIG. 10, a power feeding coil unit L500 includes a magnetic body unit C50 having a longitudinal direction which is perpendicular to the ground and including five magnetic bodies C16 to C20 which are arranged to be spaced apart in a first direction, and a plurality of power feeding coils L500 including a power feeding coil L500a formed of a wire wound around the magnetic bodies C16 to C18 and a power feeding coil L500b formed of a wire wound around the magnetic bodies C18 to C20, and a power receiving coil unit L50 includes a magnetic body L50c whose longitudinal direction is perpendicular to the ground, and a power receiving coil L50a formed of a wire wound around the magnetic body L50c. Also in this example, the plurality of power feeding coils L500, which are located adjacently in the first direction, are configured such that the wires of the plurality of power feeding coils L500 are wound in common around one or more magnetic bodies, the number of which is less than the number of magnetic bodies around which the wires of the respective power feeding coils L500a and L500b are wound. Thus, as in the embodiments described above, the advantageous effect can be achieved that a region with the reduced efficiency of power transmission from a power feeding device to a power receiving device can be reduced and high power transmission efficiency can be maintained even if any displacement occurs in the relative positions of each of the power feeding coils L500a and L500b among the plurality of power feeding coils L500 and the power receiving coil L50a.

REFERENCE SIGNS LIST

S1, S50 . . . non-contact power transmission device, 100 . . . power feeding device, 200 . . . power receiving device, VG . . . power supply, INV . . . drive unit, SEL100, SEL200 . . . selection unit, L1, L20, L30, L40, L500 . . . power feeding coil unit, L10a, L10b, L200a, L200b, L200c, L300a, L300b, L400a, L400b, L500a, L500b . . . power feeding coil, C, C20, C30, C40, C50 . . . magnetic body unit, C1, C2, C3, C4, C5, C6, C7, C8, C9, C10, C11, C12, C13, C14, C15, C16, C17, C18, C19, C20, L2c, L50c . . . magnetic body, L2, L50 . . . power receiving coil unit, L2a, L50a . . . power receiving coil, REC . . . rectifier circuit, R . . . load, SW100, SW200 . . . switching unit, SW101, SW102, SW103, SW104, SW201, SW202, SW203, SW204, SW205, SW206 . . . switch, CONT100, CONT200 . . . control unit, COM1, COM2 . . . communication unit.

What is claimed is:

1. A power feeding device for transmitting power to a power receiving device in a non-contact manner, the power feeding device comprising:
   a power feeding coil unit including a magnetic body unit in which at least three magnetic bodies are spaced apart in a first direction, and a plurality of power feeding coils each formed of a wire wound around at least two magnetic bodies of the at least three magnetic bodies in the magnetic body unit;
   a selection unit that selects a coil to which power is supplied from among the plurality of power feeding coils; and
   a drive unit that supplies power to the coil selected by the selection unit,
   wherein
   the plurality of power feeding coils, which are located adjacently in the first direction, are configured such that the wires of the plurality of power feeding coils are wound in common around one or more magnetic bodies of the at least three magnetic bodies, the number of the one or more magnetic bodies being less than the number of the at least two magnetic bodies,
   each of the at least three magnetic bodies has a longitudinal axis, and
   the longitudinal axes of the at least three magnetic bodies are spaced perpendicular to the longitudinal axes and are parallel.

2. The power feeding device according to claim 1, wherein the wires of the plurality of power feeding coils are arranged alternately in a second direction perpendicular to the first direction around the one or more magnetic bodies around which the wires are wound in common.

3. The power feeding device according to claim 1, wherein the plurality of power feeding coils are configured such that the number of the at least three magnetic bodies around which only one wire of the plurality of power feeding coils is wound is larger than the number of the at least three magnetic bodies around which two wires of the plurality of power feeding coils are wound.

4. A non-contact power transmission device for transmitting power from a power feeding device to a power receiving device in a non-contact manner, wherein
   the power feeding device is constituted by the power feeding device according to claim 1, and
   the power receiving device includes a power receiving coil, and a rectifier unit that rectifies power received by the power receiving coil and outputs the rectified power to a load.

5. The power feeding device according to claim 1, wherein the longitudinal axes of the at least three magnetic bodies are perpendicular to the first direction.

6. The power feeding device according to claim 1, wherein ends of the at least three magnetic bodies are aligned in the first direction.

7. The power feeding device according to claim 1, wherein the at least three magnetic bodies have the same length.

8. A power feeding device for transmitting power to a power receiving device in a non-contact manner, the power feeding device comprising:
   a power feeding coil unit including a magnetic body unit in which at least three magnetic bodies are spaced apart in a first direction, and a plurality of power feeding coils each formed of a wire wound around at least two magnetic bodies of the at least three magnetic bodies in the magnetic body unit;
   a selection unit that selects a coil to which power is supplied from the plurality of power feeding coils; and
   a drive unit that supplies power to the coil selected by the selection unit, wherein
   the plurality of power feeding coils, which are located adjacently in the first direction, are configured such that the wires of the plurality of power feeding coils are wound in common around one or more magnetic bodies of the at least three magnetic bodies, the number of the one or more magnetic bodies being less than the number of the at least two magnetic bodies,
   each of the plurality of power feeding coils has a longitudinal axis, and
   the longitudinal axes of the plurality of power feeding coils are spaced perpendicular to the longitudinal axes and are parallel.

* * * * *